(12) United States Patent
Olkku et al.

(10) Patent No.: US 6,449,872 B1
(45) Date of Patent: Sep. 17, 2002

(54) METHOD AND APPARATUS FOR TREATING CEREAL KERNELS, TREATED CEREAL KERNELS AND THEIR USE

(75) Inventors: Juhani Olkku, Hollola; Petri Peltola, Lahti; Pekka Reinikainen, Loppi; Esa Räsänen, Lahti; Veli-Matti Tuokkuri, Hollola, all of (FI)

(73) Assignee: LP-Tutkimuskeskus Oy, Lahti (FI)

( * ) Notice: Subject to any disclaimer, the term of this patent is extended or adjusted under 35 U.S.C. 154(b) by 0 days.

(21) Appl. No.: 09/582,776

(22) PCT Filed: Oct. 28, 1999

(86) PCT No.: PCT/FI99/00904

§ 371 (c)(1),
(2), (4) Date: Jul. 3, 2000

(87) PCT Pub. No.: WO00/25595

PCT Pub. Date: May 11, 2000

(30) Foreign Application Priority Data

Nov. 2, 1998 (FI) .................................................. 982376

(51) Int. Cl.[7] ................................................ F26B 7/00
(52) U.S. Cl. .......................................... 34/380; 34/267
(58) Field of Search ............................ 34/267, 12, 10, 34/1, 380; 426/507, 458

(56) References Cited

U.S. PATENT DOCUMENTS

| | | | | |
|---|---|---|---|---|
| 4,020,562 A | * | 5/1977 | Weyermann | .................... 34/12 |
| 4,347,670 A | * | 9/1982 | Wear et al. | ........................ 34/1 |
| 4,596,206 A | | 6/1986 | Berge et al. | |
| 4,903,414 A | | 2/1990 | White et al. | |
| 4,910,880 A | * | 3/1990 | Cole | .............................. 34/10 |
| 5,228,207 A | * | 7/1993 | Michel et al. | ................. 34/12 |
| 5,289,759 A | | 3/1994 | Hufford | |
| 5,320,856 A | | 6/1994 | Veronesi et al. | |
| 5,811,143 A | | 9/1998 | Ingemanson | |
| 6,086,935 A | | 7/2000 | Delrue et al. | |
| 6,105,273 A | * | 8/2000 | Johanson et al. | ............. 34/267 |
| 6,139,892 A | * | 10/2000 | Fredlund et al. | ............ 426/458 |
| 6,183,798 B1 | * | 2/2001 | Ishii | .......................... 426/507 |

FOREIGN PATENT DOCUMENTS

| | | | | |
|---|---|---|---|---|
| DE | 188 694 | 1/1906 | | |
| DE | 1 914 095 | 10/1970 | | |
| DE | 2 061 672 | 6/1972 | | |
| DE | 29 38 107 | 4/1981 | | |
| DE | 297 333 | 1/1992 | | |
| DE | 196 05 650 | 6/1997 | | |
| JP | 01309647 | * 12/1989 | ............. A23L/1/10 |
| JP | 40311444420 | * 5/1991 | ............ A47J/27/16 |
| WO | WO 98/11788 | 3/1998 | | |
| WO | WO 01/47364 | 7/2001 | | |

* cited by examiner

*Primary Examiner*—Teresa Walberg
*Assistant Examiner*—L Fastovsky
(74) *Attorney, Agent, or Firm*—Young & Thompson

(57) ABSTRACT

The invention relates to a heat treatment method of cereal kernels which enables the decrease in the mould content of the cereal kernels without disturbing their germinability. The method is especially applicable to the treatment of kernels to be germinated e.g. before malting. The invention also relates to the treated cereal kernels, cereal kernel products made of them and their use in malting and brewing. Further, apparatuses are described which are applicable to the heat treatment of cereal kernels.

19 Claims, 4 Drawing Sheets

METHOD AND APPARATUS FOR TREATING CEREAL KERNELS, TREATED CEREAL KERNELS AND THEIR USE

FIELD OF THE INVENTION

The invention relates to a method of treating cereal kernels (seeds) to decrease their mould content. The invention also relates to the treated cereal kernels, cereal kernel products made of them and to their use in malting, brewing, food and feed industry. The invention further relates to apparatuses for treating cereal kernels to decrease their mould content. More specifically, the method of the invention allows the mould content of the cereal kernels to be decreased without interfering with the germinability of the kernels. This is important particularly in the malting process of the kernels.

BACKGROUND OF THE INVENTION

Moulds can be found everywhere in nature, e.g. in the soil and in the air, from where they spread to growing grain. Although moulds thus belong to the natural flora of grain, their wide occurrence is harmful because they may reduce the quality of grain and malt made thereof. For example, moulds can produce various mycotoxins detrimental to health. In addition, they may e.g. decrease the germinability of a kernel and the growth of germs, which is not only harmful for seed grain but also for malting of grain. It has also been shown that the beer brewed from heavily contaminated grain and malt tends to gush, which is a big problem for the brewing industry. Gushing is apparently due to metabolites produced by Fusarium and other moulds, which metabolites survive the process of brewing.

Kernels are exposed to moulds as soon as they are sown in the soil. The growth of mould is influenced by many factors, particularly moisture, temperature and time. Other significant factors are the supply of nutrients and oxygen and the competition between micro-organisms. Growing grain is predominated by so-called field fungi, the most common of which are Alternaria, Aureobasidium, Cladosporium, Epicoccum, Fusarium, Cochliobolus, Drechslera and Pyrenophora. Some of the field fungi are plant pathogens, the most harmful of which are *Fusarium graminearum* and *F. culmorum*. Also *Cochliobolus sativus* and Fusarium ssp. cause plant diseases and may be very harmful for the malting process. Humid weather during ear maturation and harvesting in particular presents favourable conditions for the growth of Fusarium moulds.

After harvest the grain should be dried rapidly to prevent the moulds from further reproduction. Field fungi cannot reproduce themselves in grain dried in an appropriate manner (approximately 12–13% moisture content) but they remain alive and reproduce themselves again, if they are exposed to humid conditions. Poorly stored grain is dominated by so-called storage fungi, i.e. Aspergillus and Penicillium, which survive in low moisture contents. Also storage fungi reduce the quality of grain and incur health risks both to those treating contaminated grain and to those consuming it.

When grain is malted, the moisture of the grain is increased again to 45–50% and the supply of oxygen is ensured, whereby the kernel starts germinating. The prevailing conditions during the process of malting are, however, not only suitable for the germination but also for the growth of moulds. A large amount of moulds is harmful for the process.

Malting aims at effecting physical, chemical and biochemical changes in the kernel. The malting process comprises three main stages: steeping, germination and kilning. First the cleaned and sieved grain is steeped in water to achieve the adequate moisture content. When the kernels have a sufficient moisture content, they are germinated at 13–16° C. generally at least five days. This way, "green malt" is produced. Actual malt is produced by drying green malt under controlled conditions in which the temperature is slowly raised from about 45° C. to about 85° C., whereby the moisture content decreases approximately to four per cent. After drying, rootlets are eliminated, and they can be used as animal feed. Malt can also be processed into a malt extract for the food industry, for example.

Already at the stage of steeping during malting, the mould content of grain may rise, and it rises further at the stage of germination, Normal kilning of the malt does not substantially decrease the mould content of the kernels either.

Malt is mainly used for brewing beer, but also for the production of distilled spirits. Brewing comprises wort production, main and secondary fermentations and post-treatment. First the malt is milled, stirred into water and heated. During this "mashing", the enzymes activated in the malting degrade the starch of the kernel into fermentable sugars. The produced wort is clarified, yeast is added, the mixture is fermented and a post-treatment is performed.

Many moulds are known to produce toxic compounds, i.e. mycotoxins, which may prejudice animal and human health. They may also harm malting and brewing. Thus, if there are a lot of moulds in the grain, the probability of mycotoxins is also higher. The most examined mycotoxins growing in grain originate from Fusarium, *Cochliobolus sativus*, Aspergillus and Penicillium moulds.

Several species of Fusarium moulds are not only pathogens of cereals but also potential sources of various mycotoxins. Particularly important mycotoxins are trichothecenes, zearalenone (ZEN) and its derivatives, fumonisins, moniliformin, fusarochromanones and fusaric acid. More than 100 different trichothecenes have been identified and characterized. Most attention has focused on Type A trichothecenes, including T-2 toxin, neosolaniol (NEO) and diacetoxyscirpenol (DAS) and on Type B trichothecenes, comprising deoxynivalenol (DON, i.e. vomitoxin) and its acetyl derivatives (3-ADON and 15-ADON), nivalenol (NIV) and fusarenon X. Fusarium mycotoxins and the factors affecting them are presented in J. P. F. D'Mello and A. M. C. Macdonald: Some Factors Affecting the Production of Fusarium Mycotoxins, p. 35–44, in:. *J. P. F. D'Mello: Mycotoxins in Cereals: An Emerging Problem?*, Handbook for fourth SAC Conference October 1996, Edinburgh.

In the chapter "Mycotoxins in Malting and Brewing" of the above-mentioned work, B. Flanigan (p. 45–55) discusses the effects of mycotoxins on the malting and brewing industry. It is stated therein e.g. that the harmful effect of *Cochliobolus sativus* and Fusarium ssp. moulds on germinability is attributed at least in part to their production of mycotoxins, or other phytotoxic metabolites. Trichothecenes produced by Fusarium ssp. are inhibitory to the protein synthesis and thus reduce the production of alpha-amylase important for malting. Also the alpha-amino nitrogen concentrations in the wort decrease. Fusarium moulds may produce DON and zearalenone during malting. Grain and malt may also be contaminated with toxins produced by *Penicillium verrucosum* or *Aspergillus clavatus* causing allergic lung disease. T-2 toxin and other potent trichothecenes may retard fermentation, but although DON may be present in the wort, it has little effect on fermentation. Mycotoxins are not found in distilled spirits, but DON, nivalenol, fumonisins, aflatoxins, ochratoxin A and some other mycotoxins have been found in beer, but in low concentrations. Gushing of beer seems to correlate with zearalenone or DON. The health risk to humans from consuming mycotoxin contaminated beer is still uncertain, but the toxic effect of mycotoxins on farm stock fed on contaminated malting and brewing by-products is undisputed. For example, DON has been found in high concentrations in rootlets used as animal feed, and aflatoxins, zearalenones and ochratoxin A have been found in the mash waste.

Various solutions have been suggested to the problems relating to moulds in grain and malt. It is naturally worth aiming to dry the grain immediately after harvesting and to store it in dry. The growth of moulds can be retarded already in the field by spraying mould pesticides. Various cereals with a genotype resistant to e.g. Fusarium diseases have also been developed. Attempts have been made to reduce harmful effects of moulds in malting and brewing e.g. by supplying microbicidal substances, such as formaldehyde, into the steeping water. A large-scale use of formaldehyde is, however, forbidden for reasons of health. Any safe, generally acceptable chemical has not been found. Instead, the addition of lactic acid bacteria or preparations produced by them (WO94/16053) during the germination process has given good results. The effect of lactic acid bacteria of preventing the growth of moulds is apparently at least partly due to the microbicidal substances produced by them.

Surprisingly, a method of decreasing the mould content of cereal kernels with physical means has now been invented. The invention thus allows the reduction or avoidance of the above ill effects of moulds in a natural manner without the need for using chemical pesticides or other additives.

The present invention provides means for decreasing the mould content of cereal kernels without disturbing the germinability parameters of the grain. The invention thus enables the improvement of the quality of grain, particularly of grain to be malted and of seed grain. Along with the decrease in mould content, the invention also provides means for diminishing the harmful effects of moulds. The harmful effects that can be avoided by means of the invention include forming of mycotoxins, reduced germinability, reduced enzyme production, retarded growth of rootlets, retarded fermentation, gushing of beer and risks to animal and human health.

BRIEF DESCRIPTION OF THE INVENTION

The method of the invention of treating cereal kernels (seeds) is characterized by exposing the kernels to heat at such a temperature and for such a period of time that the mould content of the kernels decreases but germinability remains, whereby the temperature of the kernels to be treated is raised to 60 to 100° C. for 0.5 to 30 seconds. The cereal kernel of the invention is characterized in that it is treated with the method of the invention, and the cereal kernel product is characterized in that it is made of the cereal kernel of the invention. The invention also relates to the use of said cereal kernels in malting and the use of said cereal kernel products in brewing. An apparatus of the invention for treating cereal kernels is characterized in that it comprises transport means (1) to transport the cereal kernels, steam feeding means (2) to treat the cereal kernels with steam and air cooling means (3) to cool the cereal kernels with air, whereby the steam feeding means are adapted upstream of the air cooling means in the transport direction of the transport means. Another apparatus of the invention is characterized in that it comprises a feed box (14) to feed the kernels, a vertical pipe (13) containing a control cone (16) to disperse the kernels, and steam feeding means (19) to treat the kernels with steam. The preferred embodiments of the invention are disclosed in the dependent claims.

Cereal kernels are living material, which normally have to be treated gently so as to avoid affecting their viability. It is also well-known that moulds survive quite well the controlled heat treatment used in the kilning of green malt. Therefore it is surprising that the cereal kernels can be heat-treated in such a manner that their mould content decreases but their germinability is not weakened. In fact, the heat treatment described below was first tested on green malt, to which it was not suited, because the enzyme activity of the malt fell completely and the kernel "died". Thus, it was not to be expected that the mould content of a non-malted cereal kernel can be minimised with a proper heat treatment without harming the viability of the kernel, such as germinability parameters, and vital enzymes, e.g. $\alpha$-amylase and $\beta$-glucanase activities, which are important during germination.

DETAILED DESCRIPTION OF THE INVENTION

Figure 1:
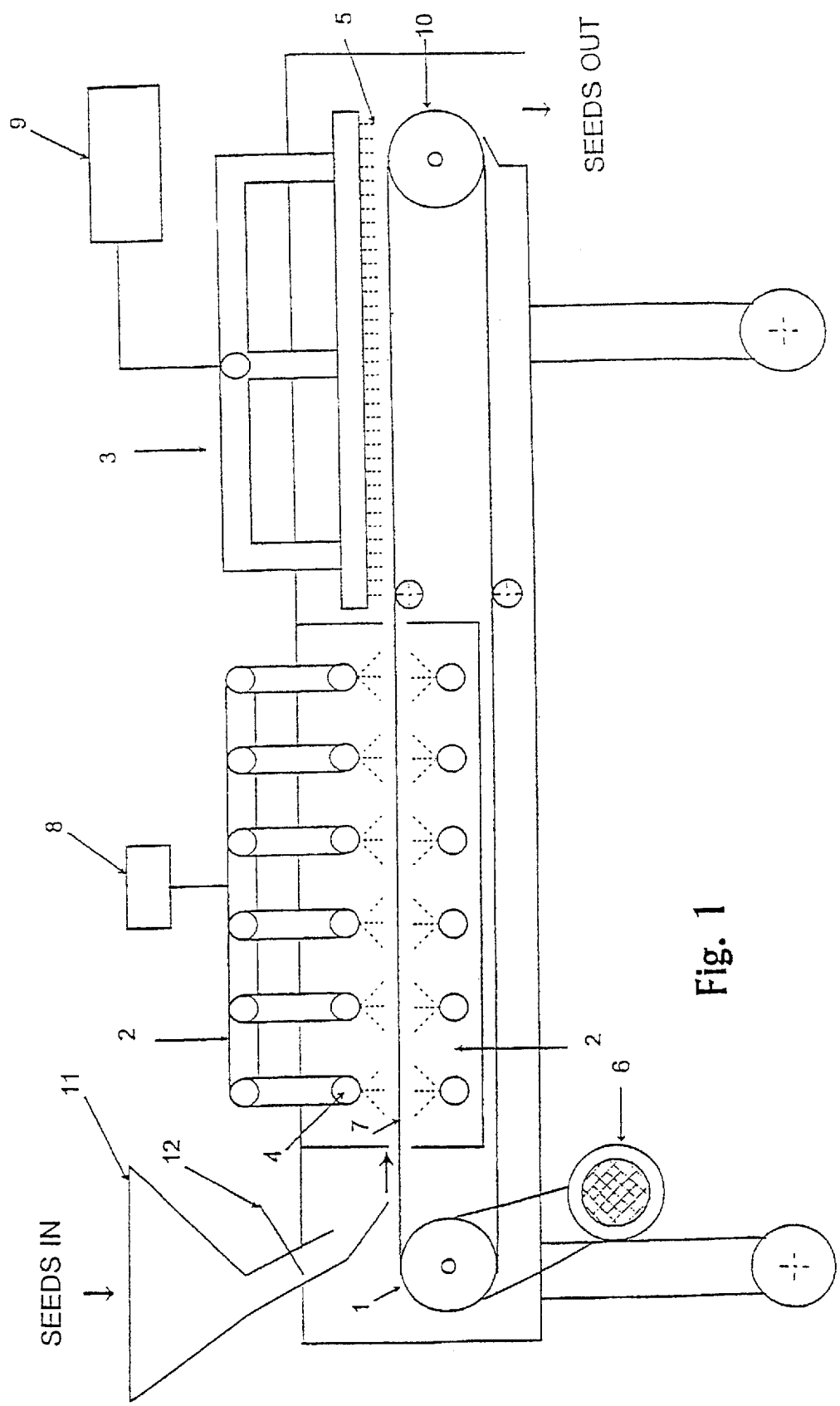
FIG. 1 shows an apparatus for treating cereal kernels to decrease their mould content.

In accordance with the invention, the mould content of cereal kernels is decreased by heat treatment of the kernels. The heat treatment of the invention also reduces the content of mycotoxins in the kernels and the gushing tendency of beer prepared from the treated kernels or from malt prepared from the treated kernels. The method of the invention applies particularly to the reduction in the amount of Fusarium moulds. The cereal kernels to be treated in accordance with the invention are generally seed dried in the storage of threshed grain. They are preferably seed material to be germinated and especially cereal kernels to be malted. The best results are achieved if a so-called starter, in this case a lactic acid bacterium preparation or a product produced by lactic acid bacteria, is added at the germination stage to the seed material to be germinated and which seed material is treated in accordance with the invention. The starter has a preventive effect on the growth of microbes during the germination process. Suitable grains to be treated in accordance with the invention are e.g. barley, rye, wheat, maize and oats, barley being particularly suitable.

The cereal kernels are exposed to heat in accordance with the invention at such a temperature and for such a period of time that are enough to substantially decrease the amount of moulds without harming the germinability parameters, such as germination capacity and germination energy. It is obvious that the higher the temperature used, the shorter a treatment time is needed. Generally it can be stated that the required heat treatment is short and vigorous. The heat treatment of cereal kernels can be implemented in various ways, and a suitable temperature and time may vary depending on the used means of heat treatment. What is essential is that the parameters of temperature and time of the method are optimised in order to decrease the mould content considerably without harming the essential vital functions of the kernel, e.g. germinability. A suitable treatment temperature can be 60 to 100° C. and time 0.5 to 30 seconds, preferably 70 to 90° C., 1 to 15 seconds. What is apparently crucial is the temperature reached in the kernel itself and its duration.

Heat treatment can be performed e.g. in a kiln. Kernels can further be heated with high frequency waves, e.g. radio or micro waves, whereby the treatment time naturally depends on the power of the used apparatus and the amount of kernels to be treated. However, the most promising results have been obtained by treating the kernels with damp heat, e.g. by sinking the kernels into hot water or treating them with steam, which is the most preferable way. The kernels may naturally also be treated with air containing the steam or water.

When kernels are treated with steam, it is preferable to use over-pressured heated steam, and preferably in such a manner that steam is sprayed from various directions onto a fairly thin layer, e.g. about 0.5 to 2 cm, of kernels. In practice the temperature of the used steam is generally 100 to 140° C. (overpressure 0 to 2.5 bar), preferably about 110 to 130° C. (overpressure about 0.4 to 1.7 bar), more preferably 115 to 125° C. (overpressure 0.7 to 1.3 bar) and particularly 120 to 125° C. (overpressure 1.0–1.3 bar). Preferably the temperature of the kernel material is raised in this treatment to about 70 to 85° C., more preferably to 75 to 79° C. and particularly to 78 to 79° C., whereby the recommendable treatment time is correspondingly about 1 to 15 seconds, preferably 5 to 10 seconds and particularly 4 to 6 seconds. In practice, it is preferable to cool the kernels after the heat treatment to avoid overheating, which would harm the germinability. Kernels can be cooled e.g. with air or water.

The cereal kernel of the invention can be any cereal kernel treated in accordance with the invention. It can be e.g. a seed, i.e. seed grain, but preferably it is barley, rye, wheat, maize or oats to be germinated and particularly barley to be malted. The cereal kernel product of the invention is made of said cereal kernel. Some examples are products of the food e.g. milling and feed industries, but particularly products of the malting and brewing industries, such as malt, malt extract, green malt, feeds originating from the process of malting, and beer.

The cereal kernels of the invention can be applied to be used in food and feed industry e.g. in milling and baking. Preferably it is used in malting and brewing, and in particular in the production of malt, to which lactic acid bacteria are added during the malting process e.g. at the steeping or germination stage. The cereal kernel products to be produced in accordance with the invention are especially applicable to beer brewing. Beer is mainly produced from malt, but a variable amount of non-malted grain can also be used therein.

An apparatus applicable to cereal kernel treatment to reduce the mould content is shown in FIG. 1. The apparatus comprises transport means 1, steam feeding means 2 and air cooling means 3. The transport means are preferably an endless conveyor, more preferably a conveyor belt with holes to let steam and air through, whereby the holes have to be so small that the kernels do not fall through them. A suitable hole size for barley is e.g. 0.5 to 1mm×5 to 10 mm. The speed of the transport means 1 is preferably adjustable, for which purpose the transport means comprise operating means 6 to regulate speed. In this connection the operating means 6 are not described in greater detail, because it is obvious for a person skilled in the art that it is easy to plan them in various ways.

The steam feeding means 2 at the forward end of the transport means which direct the steam to the kernels to be treated preferably comprise at least one steam nozzle 4 and more preferably several steam nozzles arranged in series to direct the steam to the kernels to be treated. Most preferably the steam nozzles are arranged in such a manner that steam can be sprayed to the kernels to be treated from various directions, e.g. from the top and the bottom, so that the heat treatment of the kernels would be as equal as possible. It can also be considered that steam feeding nozzles are arranged only above the conveyor 7. The steam feeding means 2 are preferably adapted to overpressured steam, the overpressure being advisably 0.1 to 2.5 bar. It is further preferred that the steam feeding means comprise means (8) to adjust the steam pressure.

The air cooling means 3 at the exit end of the transport means which cool the steamed kernels comprise an air blowing apparatus, which preferably comprises at least one nozzle 5 and more preferably several nozzles arranged in series to direct the air to the kernels to be treated. The air cooling means are particularly adapted to compressed air and comprise a compressed air source 9.

The apparatus preferably further comprises a feed funnel 11 to move the kernels to the conveyor belt 7 and removing means 10 to remove the treated kernels. Preferably the feed funnel further comprises regulating means 12, which may be e.g. a disc to regulate the thickness of the layer of the kernel to be fed onto the belt. The removing means 10 comprise the turning point of the conveyor belt at which the kernels fall due to gravitation into a collecting vessel.

The apparatus of FIG. 1 can be employed for heat treatment of the kernels by means of steam. The kernels are fed from the feed funnel 11 into the apparatus to form an about 1 cm thick layer, after which they move on the conveyor belt to a steaming area. Steam is directed onto the belt 7 from the nozzle lines above and below it (2×6 nozzle lines). The speed of the belt can be regulated and the amount of nozzle lines used can be changed. The treatment temperature of the steam and the grain moving on the belt can be regulated by steam pressure. The preferred temperature range of the steam is 100 to 140° C. and preferably 110 to 130° C. The conveyor belt moves the steamed kernels from the steaming area, where the kernels are recommended to remain 0.5 to 30 seconds and preferably 2 to 15 seconds, to the cooling area where the kernels are cooled by the compressed air blown onto the belt, after which the kernels are collected at the other end of the conveyor belt.

Figure 4:
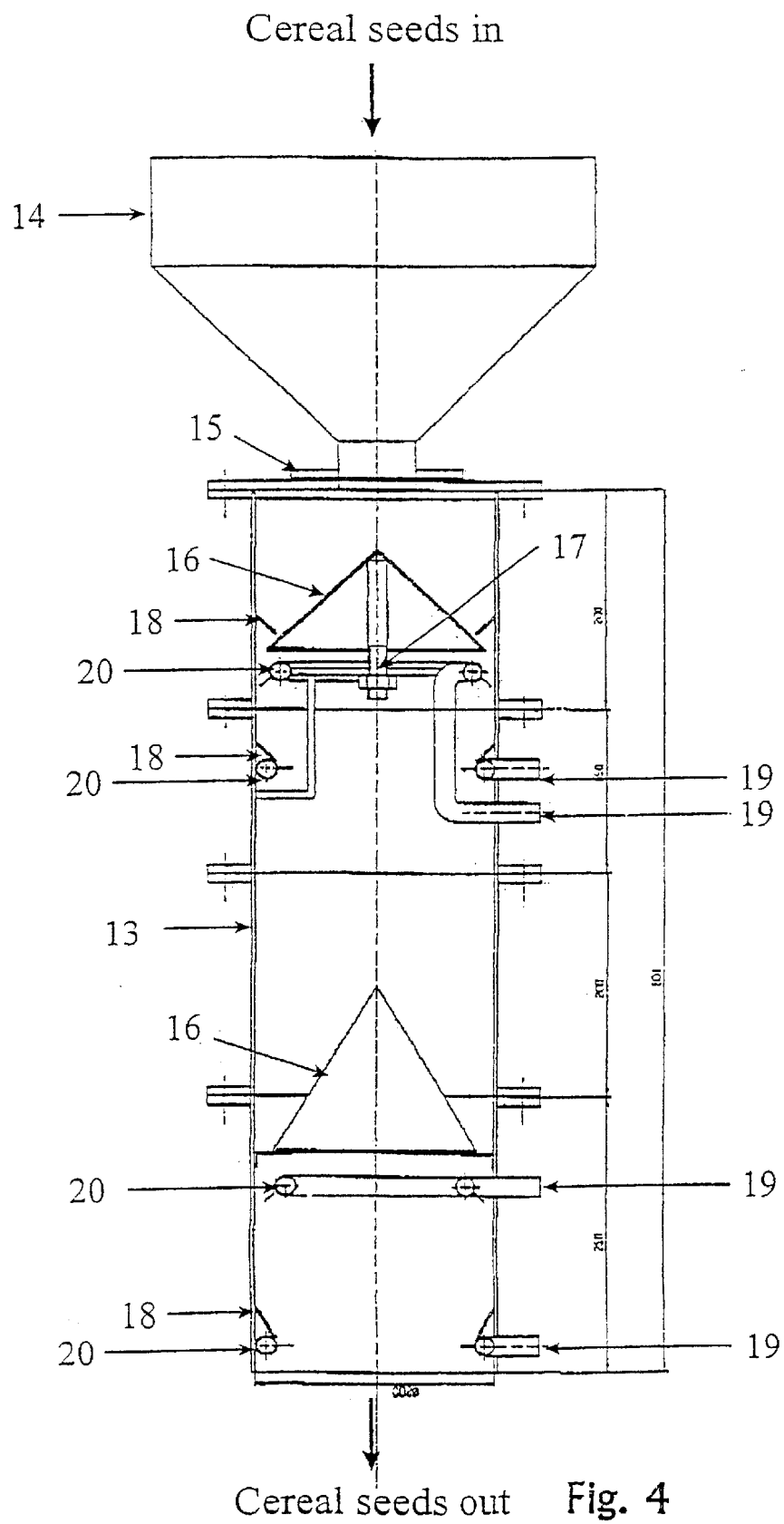
FIG. 4 shows another apparatus for treating cereal kernels to decrease their mould content.

In the apparatus of FIG. 1, the seeds move substantially in the horizontal direction during the heat treatment. However, they can also be moved in the vertical direction due to gravitation. An apparatus for treating seeds moving vertically during the heat treatment is shown in FIG. 4. Such an apparatus comprises a feed box 14 to feed the kernels, a vertical pipe 13 containing a control cone 16 to distribute the kernels, and steam feeding means 19 to treat the kernels with steam. The feed box is adapted at the top of the vertical pipe, wherein the steam treatment is to be carried out. Preferably the feed box is connected to feed adjustment means 15 to control the speed of the seeds fed. The control cone 16 preferably comprises cone moving means 17, e.g. a control screw, to rotate the cone and move it in the vertical direction. It is further preferred that the pipe includes flow controller means 18 for slowing down the speed of the seeds. The flow controller means preferably have the form of rings. The steam feeding means 19 are adapted beneath the control cone and may comprise inlets connected to the steam spreading means 20 e.g. steam rings inside pipe 13 close to its inner surface. The steam rings are pipes with holes of about 1.5 mm to direct and spread the steam. The direction of the holes is indicated by barbs in FIG. 4. Other kinds of steam spreading nozzles may also be applied.

The apparatus described above preferably comprises at least two control cones 16 arranged above each other, and several steam feeding means 19 beneath them, containing several steam spreading means 20 in the form of steam rings encircling the inner surface of the pipe to spread the steam into the pipe 13. The steaming pipe 13 may be connected to cooling means e.g. a pipe to cool the seeds with air, or to a vessel of water to drop the seeds therein.

The apparatus of FIG. 4 is suitable for heat treatment of cereal kernels to reduce the amount of kernels contaminated with moulds. The apparatus comprises a vertical steaming pipe 13 standing on a rack. The barley is fed to the apparatus through the feed box 14 and the amount of feed is controlled with the feed adjustment means 15. The barley flows through the pipe due to the gravitation and the steam stream. The speed of the moving barley is slowed down with two control cones 16 and three flow controller means 18. The upper control cone is connected to the pipe with cone moving means 17 in the form of a screw. The upper control cone can be rotated and moved in the vertical direction. The thickness of the layer of the cereal seeds can be controlled with the gap (0–2cm) between the upper cone and the upper flow controller means. The steam is fed into the steaming pipe (in the same way as in the apparatus of FIG. 1) through steam feeding means 19 comprising steam spreading means 20. The surplus steam flows out with the treated cereal seeds. The processing time in a 80 cm high steaming pipe is about 1 second. The processing time can be extended by lengthening the steaming pipe with additional modules. The heat treatment results obtained with the apparatus of FIG. 4 were similar to those obtained with the apparatus of FIG. 1.

The invention is illustrated by means of the following examples.

EXAMPLE 1

Effect of Heat Treatment on Mould Content and Germinability of Barley

Barley was heat-treated with the apparatus of FIG. 1. Table 1 describes the effect of the steam temperature, steam pressure, and the treatment temperature and treatment time on the belt on the percentage of the barley kernels contaminated with Fusarium moulds and on the germinability of the barley. Heat treatment decreased the percentage of barley kernels contaminated with Fusarium moulds without weakening germinability. The treatment even seemed to improve some germination parameters.

TABLE 1

Effect of steam temperature (pressure) and treatment temperature and treatment time on belt on mould content and germinability of barley

|  | NO TREATMENT | TREATMENT | |
| --- | --- | --- | --- |
| Steam temperature ° C. |  | 115 | 123 |
| Steam pressure bar |  | 0.7 | 1.2 |
| Temperature on belt ° C. |  | 75 | 78 |
| Treatment time in seconds |  | 10 | 5 |
| Percentage of kernels contaminated with Fusarium moulds | 25 | 8 | 1 |
| Germination capacity % | 95 | 98 | 100 |
| Germination energy (4 ml) | 97 | 100 | 100 |
| Germination energy (8 ml) | 58 | 80 | 89 |

EXAMPLE 2

Malting of Heat-treated Barley on the Scale of 1 kg

Kustaa barley having a protein content of 10.6% was malted in batches of 1 kg in a Seeger test malting device. Barley to be malted was treated for five seconds with the apparatus of FIG. 1. The temperatures of the steam used were 115° C., 120° C. and 125° C. Untreated barley was used as a comparison. Half of the barleys (containers 1 to 4)

was malted immediately after the treatment and half (containers 5 to 8) after 24 hours of storage. Storage took place at 15° C. The barleys were steeped as follows: 8 hours in water of 13° C., 16 hours in dry at 15° C. and 8 hours in water of 13° C. The barleys were germinated one day at 16° C., after which the moisture was regulated to 49 %. Thereafter, the barleys were still germinated 4 days at 14° C. After the germination, the kilning of the barleys was started with air of 50° C. and ended with air of 82° C.

Table 2 illustrates the effect of heat treatment on barley and malts made of it. Malt analyses are described e.g. in the publication *Analytica-EBC/European Brewery Convention*, published by EBC Analysis Committee, Verlag Hans Carl, Getränke-Fachverlag, Nürnberg, 1998. Heat treatment decreased the percentage of the barley kernels contaminated with Fusarium moulds and the total amount of moulds. In the scope of normal variation the malt analyses showed no differences.

EXAMPLE 3

Malting of Heat-treated Barley on the Scale of 50 kg

Kustaa barley having a protein content of 10.6% was malted in batches of 50 kg by means of a malting apparatus. The barley to be malted was treated with the apparatus of FIG. 1 for five seconds. The temperature of the steam used was 125° C. Untreated barley was used as a comparison. The barley was malted immediately after the treatment. The barleys were steeped as follows: 8 hours in water of 13° C., 12 hours in dry at 16° C. and 4 hours in water of 13° C., 12 hours in dry at 16° C. and 1 hour in water of 13° C. The barleys were germinated one day at 16° C., after which the moisture was regulated to 49%. Thereafter, the barleys were still germinated 4 days at 14° C. After the germination, the kilning of the barleys was started with air of 50° C. and ended with air of 82° C.

Figure 2:
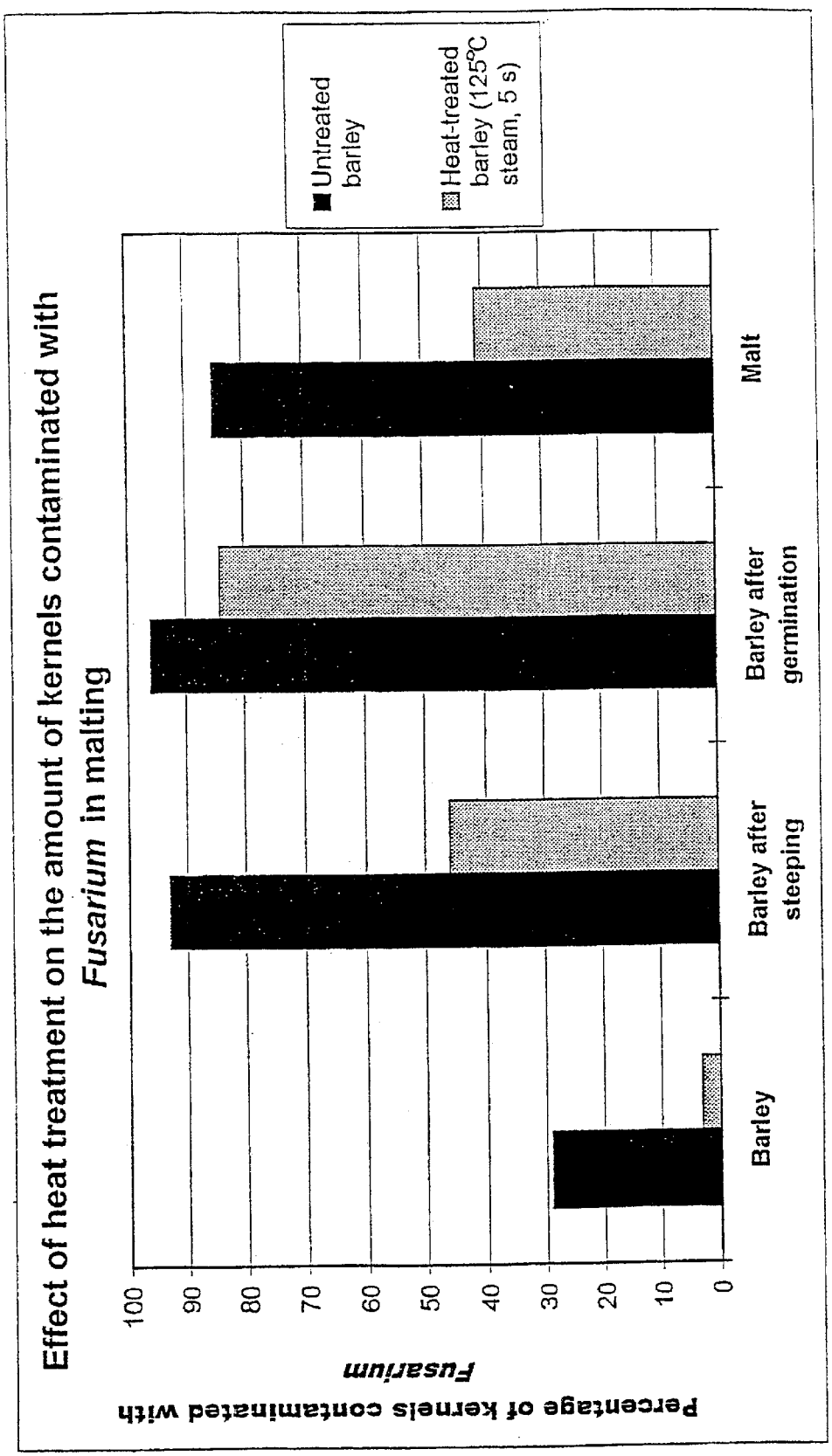
FIG. 2 illustrates the effect of heat treatment on the amount of kernels contaminated with moulds in malting 50 kg.

Table 3 describes the effect of heat treatment on barley and malts made of it. FIG. 2 illustrates the effect of heat

TABLE 2

Test malting

| | Container number | | | | | | | |
|---|---|---|---|---|---|---|---|---|
| | 1 | 2 | 3 | 4 | 5 | 6 | 7 | 8 |
| Steam temperature ° C. | No treatment | 115 | 120 | 125 | No treatment | 115 | 120 | 125 |
| Steam pressure bar | No treatment | 0.7 | 1.0 | 1.3 | No treatment | 0.7 | 1.0 | 1.3 |
| Temperature on belt ° C. | No treatment | 75 | 78 | 79 | No treatment | 75 | 78 | 79 |
| Treatment time s | No treatment | 5 | 5 | 5 | No treatment | 5 | 5 | 5 |
| Storage at 15° C. | no | no | no | no | 24 h | 24 h | 24 h | 24 h |
| BARLEY | | | | | | | | |
| Moisture % | 13.6 | 14.4 | 13.9 | 14.6 | 13.6 | 14.4 | 14.6 | 14.9 |
| Germination capacity % | 99 | 98 | 100 | 99 | 99 | 98 | 100 | 99 |
| Percentage of kernels contaminated with Fusarium moulds | 39 | 26 | 14 | 11 | 31 | 16 | 12 | 11 |
| Amount of mould colonies on Sabouraud dextrose agar cfu/g dm* | 1.7E+03 | 5.8E+02 | 1.2E+02 | 0 | 1.7E+03 | 8.2+02 | 4.7E+02 | 0 |
| MALTING PROCESS | | | | | | | | |
| Moisture after 1$^{st}$ steep % | 33.6 | 32.7 | 32.6 | 32.8 | 34.5 | 33.1 | 33.3 | 33.3 |
| Moisture after steeping % | 41.5 | 40.3 | 39.9 | 40.1 | 42.1 | 40.8 | 41.0 | 41.0 |
| Amount of germinated kernels 1 day/2 days % | 96/99 | 97/98 | 96/99 | 98/96 | 97/96 | 97/99 | 96/97 | 97/97 |
| Green malt moisture % | 48.5 | 49.1 | 48.4 | 48.8 | 47.8 | 48.9 | 48.7 | 47.9 |
| MALT ANALYSIS | | | | | | | | |
| Malt moisture % | 3.7 | 3.6 | 3.6 | 3.8 | 3.9 | 3.9 | 3.8 | 3.9 |
| Extract from flour %/d.m. | 79.7 | 79.8 | 79.7 | 79.9 | 80.1 | 80.3 | 80.4 | 80.3 |
| Wort colour °EBC | 2.5 | 2.5 | 2.5 | 2.5 | 2.5 | 22 | 2.5 | 2.2 |
| Wort pH | 5.96 | 5.96 | 5.95 | 5.96 | 5.96 | 5.96 | 5.96 | 5.96 |
| Flour-coarse extract-difference % | 1.6 | 1.6 | 1.8 | 1.9 | 2.4 | 2.3 | 2.3 | 2.1 |
| Friabilimeter, flour % | 86 | 84 | 83 | 84 | 83 | 83 | 83 | 83 |
| Friability, >2.2 mm % | 0.8 | 1.0 | 1.6 | 2.0 | 2.4 | 2.4 | 1.6 | 2.4 |
| Malt modification % | 93 | 94 | 88 | 92 | 90 | 88 | 89 | 91 |
| Homogeneity % | 74 | 77 | 71 | 76 | 74 | 73 | 68 | 71 |
| Wort viscosity mPa.s | 1.50 | 1.51 | 1.50 | 1.50 | 1.50 | 1.51 | 1.51 | 1.52 |
| Wort β-glucan mg/l | 166 | 190 | 193 | 165 | 213 | 187 | 207 | 179 |
| Soluble nitrogen mg/100 g | 562 | 569 | 563 | 565 | 572 | 561 | 585 | 547 |
| Kolbach index, % | 34 | 34 | 35 | 34 | 35 | 34 | 36 | 34 |
| FAN mg/l | 128 | 130 | 127 | 130 | 135 | 135 | 135 | 121 |
| Saccharification time min | 15 | 15 | 15 | 15 | 15 | 15 | 15 | 15 |
| α-amylase DU/g d.m. | 43 | 42 | 41 | 42 | 46 | 46 | 46 | 47 |
| Diastatic power WK/100 g d.m. | 260 | 250 | 230 | 250 | 260 | 250 | 250 | 260 |

*Amount of mould colonies on Sabouraud dextrose agar (Oxoid) cfu/g dm; the method reveals all moulds (also Fusarium) and yeasts
*cfu/g dm = colony forming units/a gram of dry matter treatment on the percentage of kernels contaminated with Fusarium moulds at different stages of malting. The heat treatment decreased the percentage of barley and malt kernels contaminated with Fusarium moulds. The heat treatment also decreased the percentage of kernels contaminated with Fusarium moulds in the samples taken after steeping and germination. In the scope of normal variation the malt analyses showed no differences.

TABLE 3

Effect of heat treatment on barley and malt made of it

| | | |
|---|---|---|
| Steam pressure ° C. | No treatment | 125 |
| Steam pressure bar | No treatment | 1.3 |
| Temperature on belt ° C. | No treatment | 79 |
| Treatment time s | No treatment | 5 |
| BARLEY | | |
| Moisture % | 13.1 | 13.1 |
| Germination capacity % | 99 | 99 |
| Percentage of kernels contaminated with Fusarium moulds | 29 | 3 |
| MALTING PROCESS | | |
| Moisture after 1$^{st}$ steep % | 31.0 | 31.4 |
| Moisture after steeping % | 44.2 | 43.4 |
| Amount of germinated kernels 1 day/2 days % | 96/98 | 96/100 |
| Green malt moisture % | 47.2 | 48.0 |
| MALT ANALYSIS | | |
| Malt moisture % | 4.3 | 4.0 |
| Extract from flour %/d.m. | 80.7 | 80.3 |
| Wort colour ° EBC | 2.5 | 2.8 |
| Wort pH | 6.02 | 6.00 |
| Flour-coarse extract-difference % | 2.1 | 1.4 |
| Friabilimeter, flour % | 88 | 89 |
| Friability, >2,2 mm % | 1.8 | 1.2 |
| Malt modification % | 94 | 98 |
| Homogeneity % | 78 | 84 |
| Wort viscosity mPa.s | 1.50 | 1.50 |
| Wort β-glucan mg/l | 144 | 92 |
| Soluble nitrogen mg/100 g | 580 | 585 |
| Kolbach index, % | 36 | 35 |
| FAN mg/l | 129 | 134 |
| Saccharification time min | 15 | 15 |
| α-amylase DU/g d.m. | 49 | 47 |
| Diastatic power WK/100 g d.m. | 290 | 290 |
| Percentage of kernels contaminated with Fusarium moulds | 85 | 41 |

EXAMPLE 4

Malting on the Scale of 1 kg After Treatment with Heat and Lactic Acid Bacteria Starter Kustaa barley having a protein content of 10.6% was malted in batches of 1 kg in a Seeger test malting device. The barley to be malted was treated with the apparatus of FIG. 1 for five seconds. The temperature of the steam used was 125° C. Untreated barley was used as a comparison. Furthermore, the effect of adding lactic acid bacteria starter was tested on malting. The starter, *Lactobacillus plantarum* VTT-E-78076, was grown in MRS broth (Oxoid) at 30° C. (the growing was performed in accordance with patent application WO96/02141). The starter growth medium including the cells was added to the first and second steep water 120 ml/kg barley. The test arrangement is shown in Table 4. The barleys were steeped at 15° C. as follows: 8 hours in water, 13 hours in dry, 3 hours in water, 11 hours in dry and 1 hour in water. The barleys were germinated one day at 16° C., after which the moisture was adjusted to 49%. Thereafter, the barleys were still germinated 4 days at 14° C. After the germination, the kilning of the barleys was started with air of 50° C. and finished with air of 82° C.

Figure 3:
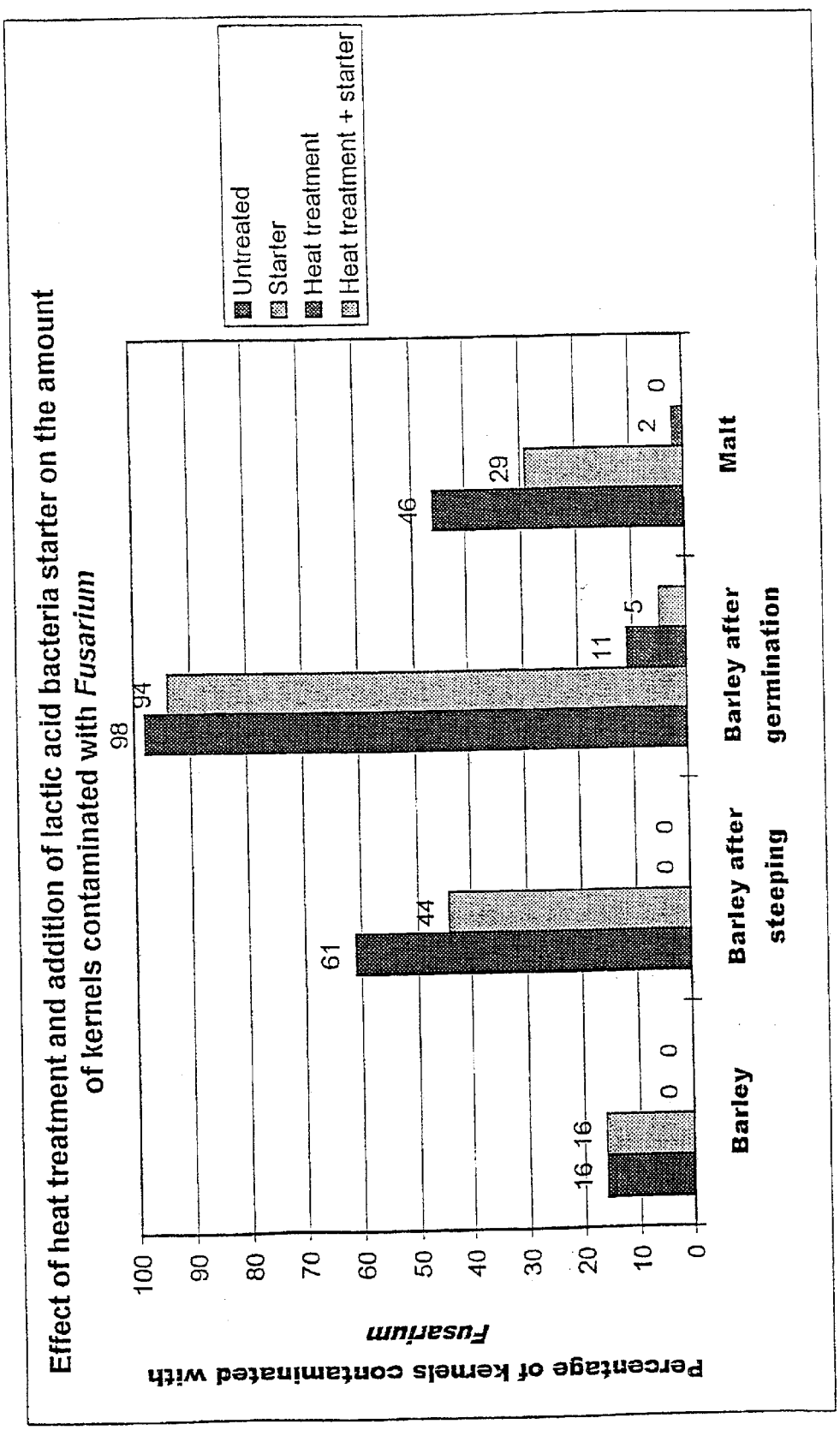
FIG. 3 illustrates the effect of heat treatment and the addition of a lactic acid bacteria starter on the amount of kernels contaminated with Fusarium moulds in malting 1 kg.

Table 4 describes the effect of heat treatment on barley and malts made of it. FIG. 3 illustrates the effect of heat treatment on the percentage of kernels contaminated with Fusarium moulds at different stages of malting. The heat treatment decreased the percentage of barley and malt kernels contaminated with Fusarium moulds. The heat treatment also decreased the percentage of kernels contaminated with Fusarium moulds in the samples taken after steeping and germination. Treatment with a starter combined with heat treatment further decreased the percentage of kernels contaminated with Fusarium moulds. In the scope of normal variation the malt analyses showed no differences.

TABLE 4

Test malting

| | Container number | | | |
|---|---|---|---|---|
| | 1 | 2 | 3 | 4 |
| Steam temperature ° C. | No treatment | No treatment | 125 | 125 |
| Steam pressure bar | No treatment | No treatment | 1.3 | 1.3 |
| Temperature on belt ° C. | No treatment | No treatment | 79 | 79 |
| Treatment time s | No treatment | No treatment | 5 | 5 |
| Starter addition | No treatment | Starter | No treatment | Starter |
| BARLEY | | | | |
| Moisture % | 13.2 | 13.2 | 16 | 16 |
| Germination capacity % | 98 | 98 | 98 | 98 |
| Percentage of kernels contaminated with Fusarium moulds | 16 | 16 | 0 | 0 |
| MALTING PROCESS | | | | |
| Moisture after 1$^{st}$ steep % | 35.9 | 35.8 | 34.7 | 34.8 |
| Moisture after steeping % | 44.6 | 43.3 | 42.6 | 41.7 |

TABLE 4-continued

Test malting

| | Container number | | | |
|---|---|---|---|---|
| | 1 | 2 | 3 | 4 |
| Amount of germinated kernels 1 day/2 days % | 99/98 | 94/97 | 96/98 | 90/95 |
| Green malt moisture % | 44.5 | 45.0 | 46.7 | 46.7 |
| MALT ANALYSIS | | | | |
| Malt moisture | 3.8 | 3.7 | 3.7 | 3.8 |
| Extract from flour %/d.m. | 79.8 | 80.3 | 80.1 | 79.9 |
| Wort colour °EBC | 2.8 | 2.8 | 2.8 | 2.8 |
| Wort pH | 6.12 | 6.05 | 6.1 | 6.02 |
| Flour-coarse extract-difference % | 3.2 | 3 | 1.7 | 1.8 |
| Friabilimeter, flour % | 80 | 82 | 87 | 86 |
| Friability, >2.2 mm % | 4 | 2.8 | 1 | 1.6 |
| Wort viscosity mPa.s | 1.51 | 1.46 | 1.53 | 1.53 |
| Wort β-glucan mg/l | 183 | 127 | 107 | 118 |
| Kolbach index, % | 35 | 37 | 36 | 36 |
| FAN mg/l | 117 | 131 | 119 | 119 |
| Saccharification time min | 15 | 15 | 15 | 15 |
| α-amylase DU/g d.m. | 41 | 43 | 37 | 36 |
| Diastatic power WK/100 g d.m. | 220 | 260 | 230 | 230 |
| Percentage of kernels contaminated with Fusarium moulds | 46 | 29 | 2 | 0 |

EXAMPLE 5

Effect of Various Methods of Heat Treatment on Mould Content and Germinability of Barley The same Kustaa barley as above was used in the tests. 50 g of barley was steeped in 5 litres of warm water, after which the barley was cooled in water of 10° C. (8 l) for 20 seconds. 25 g of barley was heated in a microwave oven and was let to cool at room temperature. The test arrangements are shown in Table 5. The sinking of barley in warm water decreased the percentage of the kernels contaminated with Fusarium moulds, while the germinability remained good. The micro-wave oven treatment also decreased the Fusarium contamination. A longer treatment time in the micro-wave oven also decreased germinability.

TABLE 5

Effect of various methods of heat treatment on the percentage of kernels contaminated with Fusarium moulds

| | Un-treated | Sinking in water for one second Temperature ° C. | | | | | Micro-wave oven (800 W) Time s | |
|---|---|---|---|---|---|---|---|---|
| Definition | | 60 | 70 | 75 | 80 | 90 | 10 | 20 |
| Percentage of kernels contaminated with Fusarium | 20 | 21 | 15 | 6 | 3 | 2 | 13 | 3 |
| Germination energy (4 ml) | 100 | 79 | 97 | 100 | 95 | 99 | 99 | 8 |
| Germination energy (8 ml) | 93 | 73 | 70 | 67 | 84 | 88 | 70 | 1 |

EXAMPLE 6

Dormant barley heavily contaminated with Fusarium moulds was treated as disclosed in Example 1. The effects of the steam temperature (pressure) and the treatment temperature and treatment time on the belt were studied on the mould content and germinability of barley. The results are given in Table 6. In the treatment, Fusarium moulds could be eliminated without interfering with the germinability parameters.

TABLE 6

Treatment of dormant barley heavily contaminated with Fusarium

| | NO TREATMENT | TREATMENT |
|---|---|---|
| Steam temperature ° C. | | 125 |
| Steam pressure bar | | 1.3 |
| Temperature on belt ° C. | | 79 |
| Treatment time seconds | | 5 |
| Percentage of kernels contaminated with Fusarium moulds | 90 | 0 |
| Germinaton capacity % | 97 | 97 |
| Germination energy (4 ml) | 17 | 8 |
| Germination energy (8 ml) | 5 | 5 |

It is apparent to a person skilled in the art that the basic idea of the invention can be implemented in various ways. The invention and the embodiments thereof are thus not restricted to the above examples but may vary within the scope of the claims.

EXAMPLE 7

Kymppi barley which was heavily contaminated with Fusarium moulds was malted in batches of 1 kg. The barley was treated with the apparatus shown in FIG. 1 in the same way as in Example 4. The effects of heat treatment on the mold content and gushing tendency were determined.

The proportion of kernels contaminated with Fusarum moulds was assayed on Czapek Iprodion Dicloral agar (CZID agar, Difco) specific for Fusarium moulds, according to a method described by Abildgren et al. (Lett. Appi. Microbiol. 5 (1987) 83–86).

The proportion of kernels contaminated with Aspergillus and Penicillium moulds (storage fungi) was assayed on Malt Salt agar (MSA, Difco). specific for Aspergillus and Penicillium moulds, according to a method described in EBC, Analytica Microbiologica, Part 2, 1991.

The proportion of kernels contaminated with field fungi (for example Alternaria, Cephalosporium, Cladosporium, Epicoccum, Stemphylium) was assayed on wet filter paper, according to a method described in EBC, Analytica Microbiologica, Part 2, 1991.

The gushing tendency was assayed according to a method described by Vaag et al. (Eur. Brew. Conv. Proc. 24$^{th}$ Congr., Oslo 1993, 155–162).

The results are shown in Table 7. The effects of heat treatment on Fusarium moulds of barley, barley after steeping, barley after germination and kilned malt were similar to the results shown earlier. Furthermore, the proportion of barley kernels contaminated with Aspergillus and Penicillium moulds (storage fungi) and field fungi was decreased without loss of germinability. The gushing tendency decreased to zero in malt prepared from the treated barley. The gushing tendency in the malt made from untreated barley was high (128 g).

TABLE 7

Malting Kymppi barley heavily contaminated with Fusarium moulds

| | NO TREATMENT | HEAT TREATMENT |
|---|---|---|
| Steam temperature° C. | | 125 |
| Steam pressure bar | | 1.3 |
| Temperature on the belt° C. | | 79 |
| Treatment time seconds | | 5 |
| BARLEY ANALYSIS | | |
| Moisture % | 13.0 | 16.1 |
| Germination capacity (H$_2$O$_2$) % | 98 | 98 |
| Germination energy 4 ml % | 17 | 30 |
| Water sensitivity 8 ml % | 4 | 7 |
| Sorting mm | >2.2 mm | >2.2 mm |
| Moulds % (contaminated kernels) | | |
| Fusarium % | 91 | 2 |
| Aspergillus | 3 | 0 |
| Penicillium | 0 | 0 |
| Alternaria | 4 | 3 |
| Cephalosporium | 9 | 1 |
| Cladosporium | 5 | 0 |
| Epicoccum | 22 | 5 |
| Stemphylium | 3 | 0 |
| MALTING PROCESS | | |
| Moisture after 1. wet steep % | 35.3 | 35.6 |
| Moisture after steeping % | 46.9 | 46.3 |
| Fusarium after steeping % (contaminated kernels) | 100 | 33 |
| Germination 2/4 days % | 90/99 | 94/99 |
| Green malt moisture % | 45.9 | 46.5 |
| Fusarium after germination % (contaminated kernels) | 100 | 88 |
| MALT ANALYSIS | | |
| Moisture % | 4.3 | 3.8 |
| Extract (flour) %/dm | 81.0 | 79.8 |
| Wort colour °EBC | 2.8 | 2.8 |
| Wort pH | 6.05 | 6.12 |
| Friability (flour) % | 72 | 78 |
| ", >2.2 mm % | 14.6 | 8.2 |
| ", whole kernels % | 8.6 | 1.8 |
| Wort viscosity cP | 1.54 | 1.68 |
| Filtration time fine min | 40 | 35 |
| Wort β-glucans mg/l | 571 | 521 |
| Soluble nitrogen mg/100 g | 518 | 521 |
| Kolbach index, % | 37 | 34 |
| FAN mg/l | 127 | 106 |
| Saccharification min | 15 | 15 |
| Gushing g | 128 | 0 |
| Fusarium % (contaminated kernels) | 99 | 95 |

EXAMPLE 8

Robust barley which was heavily contaminated with DON toxin was malted in batches of 1 kg. The barley was treated with the apparatus shown in FIG. 1 in the same way as in Example 4. The Fusarium toxins trichothecenes) such as deoxynivalenol (DON) and 3-acetyideoxynivalenol (3-ADON) were determined as trimethylsilylether derivatives by a gas chromatograph equipped with a mass selective detector (GC-MSD). Zearalenone and ochratoxin A were separated and quantified by reverse phase HPLC equipped with a fluorescence detector. The moulds were determined as in Example 7. The results are shown in FIG. 8.

The effect of heat treatment on Fusarium moulds of barley, barley after steeping and kilned malt was similar to the results shown earlier. The germinability was good in all cases. Furthermore, the proportion of kernels contaminated with Aspergillus mould decreased in malt prepared from heat-treated barley number 1. The gushing tendency decreased to 1 g in malt prepared from heat-treated barley number 2. The gushing tendency in the untreated malt was 26 g. Surprisingly, a significant reduction of mycotoxins (7–50%) in barley and malt was achieved by the heat treatment.

EXAMPLE 9

Storage of heat-treated and dried Kustaa barley was investigated.

Barley was treated with the apparatus shown in FIG. 1 in the same way as in EXAMPLE 4. After the heat treatment the moisture content of the barley was 14.3%. The barley was dried 3 hours at 45° C. in a test malting device (Seeger). After drying the moisture content of the barley was 7.9%. The barley was stored in closed vessels at 5° C. and 23° C. The germination energy (4 and 8 ml), germination capacity and the Fusarium and storage fungi contaminations were determined as described above during a period of 4 months. The results are shown in Table 9. No growth of Fusarium moulds or storage fungi could be detected. Also the germination of the barley remained unchanged at both temperatures during a period of 4 months.

TABLE 8

Malting Robust barley heavily contaminated with DON toxin

| | Box number | | | |
|---|---|---|---|---|
| | 1 | 2 | 3 | 4 |
| | Barley number | | | |
| | 1 | 1 | 2 | 2 |
| Steam temperature° C. | No treatment | 125 | No treatment | 125 |
| Steam pressure bar | No treatment | 1.3 | No treatment | 1.3 |
| Temperature on the belt° C. | No treatment | 79 | No treatment | 79 |
| Treatment time seconds | No treatment | 5 | No treatment | 5 |
| BARLEY ANALYSIS | | | | |
| Moisture % | 11.2 | 13.9 | 11.5 | 14.4 |
| Germination capacity ($H_2O_2$) % | 99 | 99 | 99 | 99 |
| Germination energy 4 ml % | 93 | 89 | 87 | 89 |
| Water sensitivity 8 ml % | 59 | 78 | 67 | 72 |
| Sorting mm | >2.2 mm | >2.2 mm | >2.2 mm | >2.2 mm |
| Fusarium % (contaminated kernels) | 82 | 12 | 83 | 5 |
| DON toxin mg/kg before malting | 4223 | 3475 | 13540 | 12209 |
| MALTING PROCESS | | | | |
| Moisture after 1. wet steep % | 31.3 | 31.6 | 31.2 | 31.7 |
| Moisture after steeping % | 44.4 | 43.8 | 44.1 | 43.9 |
| Fusarium after steeping % (contaminated kernels) | 95 | 10 | 94 | 12 |
| Germination 2 days % | 98 | 97 | 97 | 97 |
| Green malt moisture % | 44.5 | 45.1 | 45.1 | 45.2 |
| MALT ANALYSIS | | | | |
| Moisture % | 3.6 | 3.7 | 3.6 | 3.5 |
| Extract (flour) %/dm | 78.8 | 79.3 | 79.6 | 79.4 |
| Wort colour °EBC | 4.4 | 4.1 | 4.7 | 4.4 |
| Wort pH | 5.97 | 5.99 | 5.96 | 5.95 |
| Wort viscosity cP | 1.42 | 1.44 | 1.43 | 1.48 |
| Filtration time fine min | 30 | 30 | 30 | 40 |
| Wort β-glucans mg/l | 54 | 46 | 83 | 127 |
| Soluble nitrogen mg/100 g | 979 | 984 | 987 | 951 |
| Kolbach index % | 47 | 48 | 48 | 47 |
| FAN mg/l | 228 | 229 | 239 | 222 |
| Saccharication min | 15 | 15 | 15 | 15 |
| α-amylase DU/g dm | 52 | 50 | 47 | 49 |
| Diastatic power WK/100 g dm | 560 | 540 | 500 | 500 |
| Gushing g | 0 | 0 | 26 | 1 |
| Fusarium % (contaminated kernels) | 100 | 52 | 100 | 60 |
| Aspergillus % (contaminated kernels) | 51 | 8 | 0 | 0 |
| DON toxin mg/kg | 811 | 410 | 2344 | 2178 |
| 3-ADON toxin mg/kg | 77 | <50 | 128 | <50 |
| Zearalenone mg/kg | 118 | 11.1 | 156.1 | 50.3 |

TABLE 9

Storage of heat-treated and dried Kustaa barley

| Storage time | Germination energy (4 ml) % | Germination energy (8 ml) % | Germination capacity ($H_2O_2$) % | Fusarium mould contaminated kernels % | Storage fungi contaminated kernels % |
|---|---|---|---|---|---|
| Storage of barley at 23° C. | | | | | |
| before treatment | 85 | | 99 | 40 | 0 |
| after treatment | 81 | | 99 | 0 | 0 |
| 1 week | 93 | | 95 | 0 | 0 |
| 2 weeks | 94 | 47 | 99 | 0 | 0 |
| 1 month | 89 | 50 | 97 | 0 | 0 |
| 2 months | 89 | 65 | 99 | 0 | 0 |
| 3 months | 91 | 62 | 97 | 0 | 0 |
| 4 months | 88 | 68 | 96 | 0 | 0 |
| Storage of barley at 5° C. | | | | | |
| before treatment | 85 | | 99 | 40 | 0 |
| after treatment | 81 | | 99 | 0 | 0 |
| 1 week | 90 | | 93 | 0 | 0 |
| 2 weeks | 91 | 47 | 98 | 0 | 0 |

TABLE 9-continued

Storage of heat-treated and dried Kustaa barley

| Storage time | Germination energy (4 ml) % | Germination energy (8 ml) % | Germination capacity ($H_2O_2$) % | Fusarium mould contaminated kernels % | Storage fungi contaminated kernels % |
|---|---|---|---|---|---|
| 1 month | 90 | 40 | 97 | 0 | 0 |
| 2 months | 89 | 47 | 99 | 0 | 0 |
| 3 months | 94 | 40 | 97 | 0 | 0 |
| 4 months | 95 | 48 | 96 | 0 | 0 |

What is claimed is:

1. A method of treating cereal kernels to decrease their mould content, comprising transporting the kernels to a heating station, exposing the kernels to heat at such a temperature for such a period of time that the mould content of the kernels decreases but germinabilty remains, wherein the temperature of the kernels to be treated is raised to a temperature of 60 to 100° C. for 0.5 to 30 seconds, and cooling the kernels.

2. A method as claimed in claim 1, charactarized by exposing the kernels to heat at such a temperature and for such a period of time that the Fusarium mould content of the kernels decreases but the germinability remains.

3. A method as claimed in claim 1, charactarized by exposing-the kernels to heat at such a temperature and for such a period of time that the mycotoxin content of the kernels decreases but the germinability remains.

4. A method as claimed in claim 1, charactarized by the kernels to be treated being kernels to be germinated.

5. A method as claimed in claim 3, charactarized by treating barley to be malted.

6. A method as claimed in claim 1, charactarized by exposing the kernels to heat at such a temperature and for such a period of time that the gushing tendency of beer prepared from said kernels is decreased.

7. A method as claimed in claim 4, charactarized by, after the treatment, adding lactic acid bacteria at the germination stage to the kernels to be germinated.

8. A method as claimed in claim 1, charactarized by performing the heat treatment with damp heat.

9. A method as claimed in claim 8, charactarized by performing the heat treatment with steam.

10. A method as claimed in claim 9, characterized by raising the temperature of the kernels to be treated to a temperature of 70 to 90° C. for 1 to 15 seconds.

11. A cereal kernel, characterized in that it is treated with the method as claimed in 1.

12. A kernel as claimed in claim 11, characterized in that it is barley to be malted.

13. A cereal kernel product, charactarized in that it is made of the cereal kernel as claimed in claim 11.

14. A kernel product as claimed in claim 13, charactarized in that it is malt.

15. An apparatus for treating cereal kernels to decrease their mold content, said apparatus comprising transport means to transport the cereal kernels, said transport means being adapted to retain the kernels in the steaming area for 0.5 to 30 seconds, steam feeding means to direct the steam onto the kernels, said steam feeding means being adapted to raise the temperature of the kernels to a temperature range of 60 to 100° C., and air cooling means to cool the cereal kernels with air, wherein the steam feeding means are disposed upstream of the air cooling means in the transport direction of the transport means.

16. An apparatus as claimed in claim 15, characterized in that the transport means comprises an endless conveyor belt with holes and operating means for regulating the speed of the conveyor belt.

17. An apparatus as claimed in claim 15, characterized in that the steam feeding means comprises means for regulating steam pressure and several steam nozzles arranged above and below the conveyor belt and that the air cooling means comprise a compressed air source arranged to feed several air nozzles.

18. An apparatus for treating cereal kernels to decrease their mold content, said apparatus comprising a feed box to feed the kernels, and a vertical pipe containing a control cone to disperse the kernels, and flow controlling means to slow down the speed of the seeds, said control cone and flow controlling means being adapted to slow down the speed of the moving kernels to retain the kernels in the pipe for 0.5 to 30 seconds, and steam feeding means to treat the kernels with steam, said steam feeding means being adapted to raise the temperature of the kernels to be treated to a temperature range of 60 to 100° C.

19. An apparatus as claimed in claim 18, characterized in that it comprises at least two control cones, the upper one of which comprising cone moving means, and several steam spreading means in the form of rings with holes, said rings encircling the inner surface of the pipe.

* * * * *